United States Patent [19]

Adamic et al.

[11] Patent Number: 5,785,743
[45] Date of Patent: Jul. 28, 1998

[54] BLEED ALLEVIATION IN INK-JET INKS USING ORGANIC ACIDS

[75] Inventors: Raymond J. Adamic, Corvallis; James P. Shields, Philomath; Mark H. Kowalski, Corvallis, all of Oreg.

[73] Assignee: Hewlett-Packard Company, Palo Alto, Calif.

[21] Appl. No.: 567,974

[22] Filed: Dec. 6, 1995

[51] Int. Cl.[6] ............................................. C09D 11/02
[52] U.S. Cl. ............................... 106/31.27; 106/31.49; 106/31.58; 106/31.6; 106/31.78; 106/31.86
[58] Field of Search ................................. 106/20 R, 20 D, 106/22 R, 22 D, 22 K, 31.49, 31.58, 31.6, 31.78, 31.86

[56] References Cited

U.S. PATENT DOCUMENTS

| | | | |
|---|---|---|---|
| 4,963,189 | 10/1990 | Hindagolla | 106/22 K |
| 5,181,045 | 1/1993 | Shields et al. | 346/1 |
| 5,198,023 | 3/1993 | Stoffel | 106/22 R |
| 5,320,668 | 6/1994 | Shields et al. | 106/20 R |
| 5,401,303 | 3/1995 | Stoffel et al. | 106/20 R |
| 5,476,540 | 12/1995 | Shields et al. | 106/20 R |
| 5,518,534 | 5/1996 | Pearlstine et al. | 106/22 R |
| 5,531,817 | 7/1996 | Shields et al. | 106/22 R |
| 5,534,051 | 7/1996 | Lauw | 106/22 R |
| 5,536,306 | 7/1996 | Johnson et al. | 106/22 R |
| 5,555,008 | 9/1996 | Stoffel et al. | 106/20 D |

*Primary Examiner*—Helene Klemanski

[57] ABSTRACT

An organic acid component is employed in a first ink-jet ink composition to reduce the pH differential required to render insoluble the pH-sensitive colorant of a second encroaching ink-jet ink composition. By inducing the precipitation of the pH-sensitive colorant, migration of the colorant is inhibited, thereby substantially reducing bleed between the pH-sensitive ink and the ink containing the organic acid (the "target" ink). The organic acid component is employed at a concentration ranging from about 0.25 to 20 wt % and may be represented by such as acids as polyacrylic, acetic, glycolic, malonic, malic, maleic, ascorbic, succinic, glutaric, fumaric, citric, tartaric, lactic, sulfonic, ortho-phosphoric acid, derivatives thereof. Without the organic acid component, a pH differential on the order of at least 4 and more likely 5 units must exist between the pH-sensitive ink and the target ink to substantially eliminate bleed. By employing an organic acid in the practice of the invention, a pH differential on the order of only 1 to 3 units may be required. Therefore, assuming the pH-sensitive ink has a pH of about 8, the pH of the target ink could be as high as 7 in the practice of the invention as opposed to a pH of about 3 in the absence of an organic acid component.

18 Claims, 1 Drawing Sheet

BLEED ALLEVIATION IN INK-JET INKS USING ORGANIC ACIDS

TECHNICAL FIELD

The present invention relates to ink-jet printing, especially in thermal ink-jet printing, and, more particularly, to the reduction or elimination of bleed between black and color ink compositions printed adjacent to one another.

BACKGROUND ART

Ink-jet printing is a non-impact printing process in which droplets of ink are deposited on a print medium in a particular order to form alphanumeric characters, area fills, and other patterns thereon. Low cost and high quality of the output, combined with relatively noise-free operation, have made ink-jet printers a popular alternative to other types of printers used with computers.

The non-impact printing process of ink-jet printing involves the ejection of fine droplets of ink onto a print media such as paper, transparency film, or textiles in response to electrical signals generated by a microprocessor. There are two basic means currently available for achieving ink droplet ejection in ink-jet printing: thermally and piezo-electrically. In thermal ink-jet printing, the energy for drop ejection is generated by electrically heated resistor elements, which heat up rapidly in response to electrical signals from a microprocessor to create a vapor bubble, resulting in the expulsion of ink through nozzles associated with the resistor elements. In piezoelectric ink-jet printing, the ink droplets are ejected due to the vibrations of piezoelectric crystals, again, in response to electrical signals generated by the microprocessor.

In commercially-available thermal ink-jet color printers, such as a DeskJet® printer available from Hewlett-Packard Company, a color spectrum is achieved by combining yellow, magenta, and cyan inks in various proportions. A four-pen set is typically employed in such printers to achieve the necessary color combinations. The yellow, magenta, and cyan inks derive their hues from yellow, magenta, and cyan colorants, respectively.

Colorants for inks are available in the form of dyes or pigments. Accordingly, ink-jet inks are available as either dye-based or pigment-based compositions. Of the two, dye-based ink-jet ink compositions are much more widely available. Dye-based ink-jet ink compositions are generally aqueous-based and are formulated by dissolving dye in an ink vehicle. The dye molecules employed in ink-jet ink compositions are often in the form of dye salts made of a dye anion and a cation such as sodium or tetramethylammonium (TMA). A limited number of pigment-based ink-jet inks are also available, which generally comprise a pigment dispersed in an aqueous solution by a dispersant. Although pigments offer the very desirable properties of waterfastness and lightfastness, their natural tendency to agglomerate in aqueous media and their lack of uniform size distribution have dampened industry enthusiasm for their employment as ink-jet ink compositions in comparison to dye-based inks.

Regardless of whether an ink is dye-based or pigment-based, ink-jet inks are commonly plagued by the occurrence of bleed. The term "bleed", as used herein, is defined to be the invasion of one color into another, as evidenced by a ragged border therebetween. Bleed occurs as colors mix both on the surface of the paper substrate as well as within the substrate itself. The occurrence of bleed is especially problematic between a black ink and an adjacently-printed color ink because it is all the more visible. Hence, to achieve good print quality, bleed must be substantially reduced or eliminated such that borders between colors are clean and free from the invasion of one color into the other.

Various solutions to the problem of black to color and color to color bleed have been proffered. Some solutions involve changing the ink environment to reduce bleed. For instance, heated platens and other heat sources, along with specially-formulated paper, have been employed to reduce bleed. However, heated platens add cost to the printer, and specially formulated paper is more expensive than "plain" paper. Thus, using external paraphernalia to reduce bleed in thermal ink-jet color printing is generally not cost effective.

Other proposed solutions involve changing the composition of a thermal ink-jet ink to reduce bleed. For example, surfactants have been used to increase the penetration rate of the ink into the paper. However, increasing the penetration rate in this fashion may also reduce edge acuity. A solution to the specific problem of black to yellow color bleed is disclosed in U.S. Pat. No. 5,198,023, issued Mar. 30, 1993 and assigned to the same assignee as the present application, wherein multivalent cations such as calcium chloride and magnesium chloride are added at concentrations ranging from about 1 to 10 wt % to yellow cationic aqueous-based inks to prevent bleed between yellow and black inks. However, it has been determined that the addition of large amounts of multivalent cations to thermal ink-jet ink compositions may induce precipitation of dye salts, requiring further adjustments in the ink composition (see, e.g., pending application Ser. No. 08/500,759, filed Jul. 11, 1995, now U.S. Pat. No. 5,534,051, issued Jul. 9, 1996, entitled "Specific Dye Set for Thermal Ink-Jet Printing", filed by Hiang P. Lauw and assigned to the same assignee as the present application).

Another method of reducing bleed between ink-jet inks involves the use of pH-sensitive dyes as disclosed in U.S. Pat. No. 5,181,045 (hereafter Shields et al '045) entitled "Bleed Alleviation Using pH-Sensitive Dyes", issued Jan. 19, 1993, and assigned to the same assignee as the present application. It is disclosed therein that an ink having a pH-sensitive dye would be prevented from bleeding into an adjacent ink having an appropriate pH. More particularly, migration of the ink having the pH-sensitive dye is prevented by rendering the dye insoluble on the page by contact with the pH of the adjacent ink. Thus, bleed is reduced or eliminated by using both the "pH-sensitive" ink as well as the "target" ink. Typically, since the invasion of a black dye into a color ink is more problematic than vice versa because of its greater visibility, the black ink would employ a pH-sensitive dye and the pH of the color ink would be controlled in the practice of the invention, such that the black ink would be prevented from bleeding into the color ink. The method of '045 requires a pH differential of about 4 (or even 5) units to completely control bleed. Accordingly, a pH not exceeding about 4 would be required to effectively eliminate bleed from a pH-sensitive ink having a typical pH of about 8.

However, subsequent to the disclosure of Shields et al '045, demands on printer performance have increased. Printers are expected to perform faster and at ever increasing levels of throughput. Consequently, merely controlling the pH of an ink per Shields et al '045 may no longer be effective in controlling bleed. Rather, a larger pH differential than 4 units appears necessary to control bleed in many situations. Thus, for a pH-sensitive black ink having a pH of about 8, the pH of the "target" color ink would necessarily be adjusted to less than about 3 to achieve bleed control, compared to the pH of 4 disclosed by Shields et al '045.

Such low pH conditions create a harsh ink environment that may induce corrosion of the ink-jet pen as well as give rise to compatibility problems between ink components.

Therefore, a need exists for a means to reduce the pH differential required to effect precipitation of a pH-sensitive colorant, such that a reduction in bleed is achieved in a relatively high pH environment that is less corrosive to ink-jet printer parts and less constraining to the formulation of ink-jet ink compositions compared to the low pH environment of Shields et al '045.

DISCLOSURE OF INVENTION

In accordance with the invention, an ink-jet ink composition and method for reducing bleed are provided which effect precipitation of a pH-sensitive colorant contained in an adjacently printed ink-jet ink composition using a narrower pH differential than that disclosed by Shields et al '045. More specifically, an ink-jet ink composition is provided which includes an organic acid at a concentration ranging from about 0.25 to 20 wt % of the ink-jet ink composition. The presence of the organic acid in the ink-jet ink composition reduces the pH differential required to render insoluble the pH-sensitive colorant of a second encroaching ink-jet ink composition. For convenience of discussion, the ink containing the organic acid component is referred to hereafter as the "target" ink, while the ink containing the pH-sensitive colorant is referred to as the "pH-sensitive" ink.

By inducing the precipitation of the pH-sensitive colorant, migration of the colorant is inhibited, thereby helping to reduce bleed between different inks. Precipitation is induced by contacting the pH-sensitive colorant with the target ink having an appropriate pH. Whereas Shields et al '045 disclose a pH differential between the target ink and the pH-sensitive ink of about 4 to 5 units, a pH differential on the order of 3 units or even less is sufficient to substantially reduce bleed in the practice of the invention. Therefore, assuming the pH-sensitive ink has a pH of about 8, the pH of the target ink could be as high as 7 in the practice of the invention as opposed to a pH of about 3 in the absence of an organic acid component.

BEST MODES FOR CARRYING OUT THE INVENTION

Figure 1:
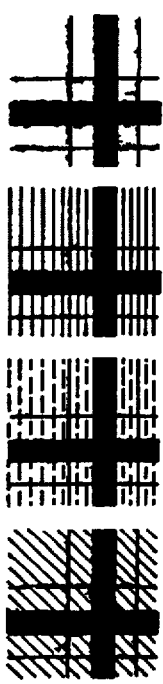
FIGS. 1A–D and 2A–D are line drawings illustrating the bleed occurring between various color inks having formulations outside of the scope of the invention and a cross-hatching of black ink having a pH-sensitive dye.
Figure 2:
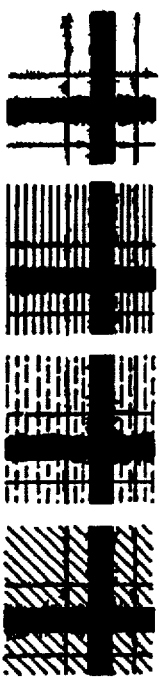
Figure 3:
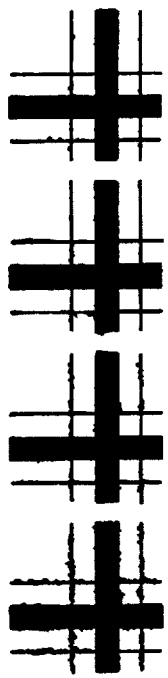
FIGS. 3A–D are line drawings illustrating the bleed control achieved with four different combinations of three yellow inks, two of which were formulated in accordance with the invention, the inks having been printed on Gilbert Bond paper and over-printed by a cross-hatching of black ink having a pH-sensitive dye.
Figure 4:
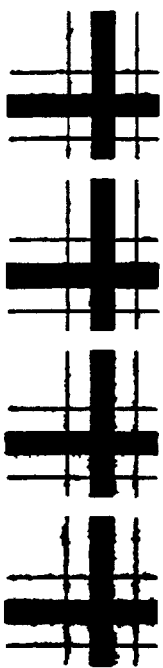
FIGS. 4A–D are line drawings illustrating the bleed control achieved with the ink combinations of FIGS. 3A–D as printed on Champion Datacopy paper.
Figure 5:
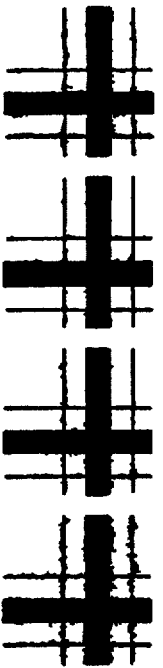
FIGS. 5A–D are line drawings comparing the bleed control achieved with yellow ink formulated in accordance with the invention versus yellow ink formulated with a multivalent ion, with the yellow inks having been printed on Gilbert Bond paper and over-printed by a cross-hatching of black ink having a pH-sensitive dye.
Figure 6:
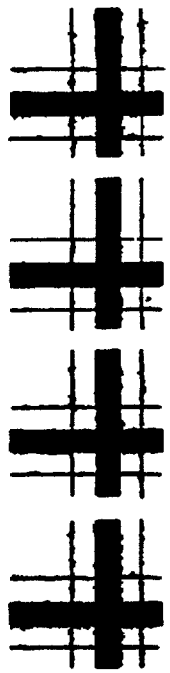
FIGS. 6A–D are line drawings illustrating the bleed control achieved with the inks of FIGS. 5A–D as printed on Champion Datacopy paper.

The invention described herein is directed to improving the method of reducing bleed between adjacently-printed color inks disclosed in U.S. Pat. No. 5,181,045, hereinafter "Shields et al '045". More specifically, Shields et al '045 discloses that bleed may be reduced between two adjacently-printed color ink-jet inks by formulating one ink to comprise a pH-sensitive dye and the other ink with an appropriate pH to cause the pH-sensitive dye to precipitate. Without subscribing to any particular theory, the inventors of Shields et al '045 suggest that by forming a dye to become insoluble on the page, the migration of the dye will be inhibited, such that bleed is reduced between colors. Thus, the method of Shields et al '045 involves providing a sufficient pH differential between two ink compositions such that the pH-sensitive dye in one ink precipitates and inhibits bleed.

The pH differential required in Shields et al '045 to completely control bleed is typically on the order of about 4 to 5 units. Thus, if the pH-sensitive ink has a pH on the order of 7 or 8, as is common among thermal ink-jet ink compositions, the adjacently-printed target ink composition would require a pH ranging from about 2 to 4 to essentially inhibit bleed. Thus, the level of acidity required to control bleed becomes a concern, since the ink-jet ink compositions may actually become corrosive to the ink-jet printer parts. Moreover, this range of acidity may have adverse effects on certain other ink components.

In accordance with the invention, an organic acid component is added to the so-called target ink-jet ink composition, as opposed to the pH-sensitive ink composition. The organic acid component reduces the pH differential required to control bleed. Whereas the pH differential required to control bleed in Shields et al '045 without the assistance of an organic acid is on the order of 5 units in today's more demanding printing environment, the addition of an organic acid reduces the required pH differential to about 3 units, or even as little as 1 unit. Therefore, by incorporating an organic acid component in the target ink composition and maintaining its pH at about 3 units lower than that of the pH-sensitive ink, the encroachment of an adjacently-printed pH-sensitive colorant may be substantially halted. Therefore, while a pH of 3 or less is typically required to completely control bleed for present-day ink-jet printers using the method of Shields et al '045, the addition of an organic acid component to the target ink composition enables one to control bleed with a pH of at least about 4.

Before specifically addressing the ink components, it should be noted that the purity of all components is that employed in normal commercial practice for ink-jet ink compositions. Weight percents represent percent of the total ink composition, unless otherwise indicated.

The organic acid component should be present in the target ink-jet ink composition at a concentration ranging from about 0.25 to 20 wt %. An organic acid concentration of less than about 0.25 wt % would be insufficient to effectively reduce the pH differential, while an organic acid concentration of more than about 20 wt % would affect the reliability of printhead operation. Preferably, the acid concentration is in the range of about 1 to 5 wt %.

Examples of organic acids that may be suitably employed in the practice of the invention include, but are not limited to, mono-, di-, and polyfunctional organic acids. In general, it is contemplated that any soluble organic acid having a pKa equal to or less than that of the pH-sensitive colorant of concern may be suitably employed. Preferably, one of the following classes of organic acids is employed: polyacrylic, acetic, glycolic, malonic, malic, maleic, ascorbic, succinic, glutaric, fumaric, citric, tartaric, lactic, sulfonic, and orthophosphoric acid and derivatives thereof. The organic acid component may also comprise mixtures of appropriate organic acids. The particular acid employed depends the particular ink formulations. Glycolic acid is generally preferred, although any of the other organic acids may also be suitably employed in the practice of the invention.

An ink-jet ink composition employing an organic acid component and having an appropriate pH will, in accordance with the present invention, render insoluble a pH-sensitive colorant contained in an encroaching ink-jet ink composition. A pH-sensitive colorant is a colorant that becomes insoluble under specific and well-defined pH conditions. In the practice of the invention, the pH-sensitive colorant may be either a dye or a pigment. Examples of pH-sensitive dyes are carboxylated dyes, such as azo dyes, xanthene dyes, copper phthalocyanine dyes, and the like. Examples of inks with pigments that may be suitably employed in the practice of the invention include any pigment that is dispersed with a dispersant having a pH-sensitive functionality, for example, the Joncryl® polymers available from S. C. Johnson Polymer (Racine, Wis.). Other colorants exhibiting differential solubility with pH may also be employed in the practice of the invention.

The colorant employed in the so-called "target" ink composition likewise may be either a dye or a pigment, although it is contemplated that the target ink composition will be dye-based, employing any of the water-soluble dyes used in inks for ink-jet printers. Examples of such dyes include, but are not limited to, Food Black 2, Carta Black, Direct Black 19, Direct Black 51, Direct Black 109, Direct Black 154, Direct Blue 86, Direct Blue 199, Direct Red 9, Direct Red 32, Acid Yellow 23, Acid Blue 185, Acid Blue 9, Acid Red 17, Acid Red 52, Acid Red 249, and Reactive Red 180. The concentration of such a dye preferably ranges from about 0.1 to 7 wt %. Less than about 0.1 wt % results in an ink of unacceptable lightness, while greater than about 7 wt % results in clogging of the orifices in the ink-jet pen. More preferably, the dye is present within the range of about 0.1 to 4 wt % of the ink-jet ink composition. A mixture of dyes may also be employed.

The vehicles of the pH-sensitive ink and the so-called target ink may comprise such vehicle components found in commercial practice as are compatible with their respective colorants. For a target dye-based color ink, the vehicle preferably comprises, in addition to the organic acid component, at least one diol, at least one glycol ether, 2-pyrrolidone, "other" components such as surfactants and biocides, and water. More specifically, the vehicle of a target dye-based color ink preferably comprises the following concentrations, expressed as a percentage of total ink composition: (a) about 3 to 20 wt % of at least one diol; (b) up to about 5 wt % of at least one glycol ether; (c) about 3 to 9 wt % of 2-pyrrolidone; (d) up to about 4 wt % of a surfactant; (e) about 0.25 to 20 wt % of at least one organic acid; and (f) the balance water. While the above-described vehicle formulation is preferred, any aqueous-based vehicle suitable for ink-jet ink compositions may be benefited in the practice of the invention.

Examples of diols that may be employed in the ink vehicle include any of, or a mixture of two or more of, such compounds as ethanediols (e.g., 1,2-ethanediol); propanediols (e.g., 1,2-propanediol, 1,3-propanediol, 2-ethyl-2-hydroxymethyl-1,3-propanediol, ethylhydroxypropanediol (EHPD), etc.); butanediols (e.g., 1,3-butanediol, 1,4-butanediol, etc.); pentanediols (e.g., 1,5-pentanediol); and hexanediols (e.g., 1,6-hexanediol, 2,5-hexanediol, etc.). Preferably 1,5-pentanediol and EHPD are employed in the ink vehicle.

The glycol ether component of the ink vehicle may comprise any of the glycol ethers and thioglycols ethers, and mixtures thereof, commonly employed in ink-jet ink compositions. Examples of such compounds include polyalkylene glycols such as polyethylene glycols (e.g., diethylene glycol, triethylene glycol, tetraethylene glycol, etc.) polypropylene glycols (e.g., dipropylene glycol, tripropylene glycol, tetrapropylene glycol, etc.); polymeric glycols (e.g., PEG 200, PEG 300, PEG 400, PPG 400, etc.) and thioglycol. Preferably diethylene glycol is employed in the ink vehicle.

Other components that may be employed in the present ink vehicle include surfactants, biocides, and the like, each of which are commonly employed additives in ink-jet printing.

With particular regard to the surfactant component, one well-known purpose of a surfactant is to prevent color to color bleed by increasing the penetration of the inks into the print medium. Surfactants may also be employed to create a substantially uniform surface energy in the ink, thereby reducing the occurrence of mis-directed drops due to puddling of ink on the nozzle plate. Examples of classes of surfactants that are preferably employed in the present ink compositions include anionic surfactants and nonionic surfactants.

Consistent with the requirements for this invention, various other types of additives may be employed in the ink to optimize the properties of the ink composition for specific applications. For example, as is well known to those skilled in the art, one or more biocides, fungicides, and/or slimicides (microbial agents) may be used in the ink composition as is commonly practiced in the art. Examples of suitably employed microbial agents include, but are not limited to, NUOSEPT (Nudex, Inc.), UCARCIDE (Union Carbide), VANCIDE (RT Vanderbilt Co.), and PROXEL (ICI America). Additionally, sequestering agents such as EDTA may be included to eliminate deleterious effects of heavy metal impurities.

An example of a so-called "target" ink-jet ink composition that is formulated in accordance with the invention to include an organic acid and to exhibit a pH of about 4 is the following yellow dye-based ink: (a) about 2.75 wt % Acid Yellow 23 associated with tetramethylammonium (TMA); (b) about 4.0 wt % diethylene glycol (DEG); (c) about 8.0 wt % EHPD; (d) about 4.0 wt % 2-pyrrolidone; (e) about 2.5 wt % nonionic surfactant; (f) about 5.0 wt % citric acid; (g) sufficient tetramethylammonium hydroxide to buffer the pH of the ink solution to about 4; and (h) the balance water.

An example of a black ink-jet ink composition that contains a pH-sensitive dye has a formulation given by: (a)

about 2.2 wt % of a black carboxylated dye, such as Black 286 dye and Black 287 dye which are similar to the dyes disclosed in U.S. Pat. No. 4,963,189 (filed by Suraj L. Hindagolla and assigned to the same assignee as the present application); (b) about 7.5 wt % 2-pyrrolidone; (c) about 0.2 wt % tris(hydroxymethyl)-aminomethane; (d) about 0.06 wt % ethylenediaminetetraacetic acid (EDTA) in free acid form; (e) about 0.2 wt % ammonium dihydrogen phosphate; (f) about 0.0075 wt % Voranol 3010 polyol; (g) about 0.03 wt % Proxel GXL; and (h) the balance water. This black ink is commonly formulated to have a pH of about 8.5, with the dye in this ink known to come out of solution as the pH drops to about 6.5. If this black ink is printed adjacent to the above-described yellow ink on a print medium, the pH differential therebetween would be sufficient to precipitate the pH-sensitive dye in the black ink and to therefore prevent bleed from the black ink to the color ink, even in the more demanding present-day ink-jet printers.

As an additional, and unexpected benefit, the ink-jet ink composition of the present invention alleviates a problem called "deceleration", or decel, which, in thermal ink-jet technology, refers to a deceleration of drop velocity during continuous firing of a nozzle or nozzles. This can lead to drop misdirection, misplacement, or even nozzle turn-off (where velocity equals 0). Without subscribing to any particular theory, it appears that the presence of the organic acid serves to prevent the formation of transient insoluble material that can affect heat transfer from the firing resistor to the ink, thereby causing inefficient drive bubble formation, thereby causing decel.

Notably, while the specific examples herein are directed to the use of a target ink having a lower pH than the pH-sensitive ink, it is also possible to employ an ink having a higher pH than the pH-sensitive ink. In this case, the pH-sensitive ink would have the property that it precipitates as the pH is increased.

Regarding the use of a buffer in the ink-jet ink compositions, it is important to note that the buffer capacity must not be so high as to overwhelm the effects of the lower pH ink. In practice, the bleed control effect can work when the ink containing the pH-sensitive colorant contains a buffer, such as tris[hydroxymethyl]aminomethane or a phosphate or borate buffer.

While the method of the present invention may be employed to reduce or eliminate bleed between any two ink-jet inks, it is expected to find greatest use in preventing black to color bleed and color to color bleed, since color to black bleed is virtually unnoticeable. Therefore, it is contemplated that the invention will be practiced such that the black ink in an ink set is formulated to contain a pH-sensitive colorant while the color inks will be formulated to contain an organic acid and to exhibit a pH that differs from the pH of the black ink in accordance with the present invention. It follows that black to color bleed will have been substantially eliminated in such an ink set.

In sum, the present method involves modification of two ink formulations to bring about the desired effect of bleed control therebetween. The pH-sensitive colorant is incorporated into the ink-jet ink composition having the tendency to bleed into adjacent inks (or the ink yielding the most visible signs of bleed), whereas an organic acid is incorporated into the ink-jet ink composition whose borders might otherwise have been compromised (e.g., the "target" ink). By maintaining a pH differential on the order of 3 units, or even less for more sensitive colorants, bleed by the pH-sensitive ink into the target ink will have been substantially eliminated.

While the specific examples herein employ only dye-based color inks as target inks, it is noted that both the pH-sensitive ink and the target ink may be either dye-based or pigment-based in the practice of the invention.

The advantages realized in the practice of the invention are illustrated in the examples below.

EXAMPLES

The figures illustrate the efficacy of organic acids as precipitants. Further, a comparison is done between the amount of bleed occurring in the practice of the invention versus that occurring in spite of the incorporation of a multivalent cation as well as that occurring without any bleed control measures. Moreover, the bleed control achieved for both dye-based and pigment-based pH-sensitive inks is illustrated.

To perform these examples, a DeskJet® printer was modified such that it could carry two pens. One of these pens was a tri-chamber pen and the other was a single-chamber pen. There is no reason why both pen positions could not be occupied by tri-chamber pens or both by single-chamber pens; however, for this implementation, a pen of each type was used in the two pen position. The tri-chamber pen was employed to print color (e.g., yellow) ink while the single-chamber pen was employed to print black ink for evaluation of black to color bleed. While any combination of color and black inks might have been used to illustrate the benefits of practicing the invention, yellow and black inks were employed for their contrast so that bleed would be readily observable. The yellow and black inks were printed onto either Gilbert Bond paper or Champion Datacopy paper, as indicated for each example.

To first illustrate the problem of black to color bleed addressed by the method of the invention, FIGS. 1A-D depict the black to color bleed that occurs in the absence of any bleed control measure. FIG. 1A depicts a yellow area cross-hatched by black ink; FIG. 1B depicts a red area (represented by thin vertical lines) cross-hatched by black ink; FIG. 1C depicts a blue-violet area (represented by dashed vertical lines) cross-hatched by black ink; and FIG. 1D depicts a green area (represented by thin diagonal lines) cross-hatched by black ink. The yellow, red, blue-violet, and green areas of FIGS. 1A-D were printed using combinations of the following three primary-color ink formulations loaded in the tri-chamber pen, none of which are formulated in accordance with the invention:

TABLE 1

Color Ink Formulations of FIGS. 1A-D
(All values are weight percent unless otherwise indicated.)

| Component | Cyan Ink | Yellow Ink | Magenta Ink |
|---|---|---|---|
| dye | 1.5 AB9-Na[1] | 0.86 AY23-TMA[2] 1.0 DY 86-TMA[3] | 1.3 AR 52-Na[4] |
| 1,5-pentanediol | 9.2 | 9.2 | 9.2 |
| zwitterionic surfactant[5] | 1.05 | 1.05 | 1.05 |
| sodium alginate | 0.29 | 0.29 | 0.29 |
| nonionic surfactant[5] | 2.3 | 2.3 | 2.3 |
| Ucarcide 250 | 0.3 | 0.3 | 0.3 |
| water | 85.4 | 85.0 | 85.6 |
| pH | 7 | 7 | 7 |

[1] Acid Blue 9-Na
[2] Acid Yellow 23-TMA (tetramethylammonium)
[3] Direct Yellow 86-TMA TABLE 1-continued Color Ink Formulations of FIGS. 1A–D
(All values are weight percent unless otherwise indicated.)

| Component | Cyan Ink | Yellow Ink | Magenta Ink |
|---|---|---|---|

[4]Acid Red 52-Na
[5]Surfactants commonly employed in ink-jet inks

The black ink of FIGS. 1A–D, as well as that of FIGS. 3–6, has the following formulation: (a) 1.1 wt % each of Black 286 and Black 287 dye; (b) 7.5 wt % 2-pyrrolidone; (c) 0.2 wt % tris(hydroxymethyl)-aminomethane; (d) 0.06 wt % ethylenediaminetetraacetic acid (EDTA) in free acid form; (e) 0.2 wt % ammonium dihydrogen phosphate; (f) 0.0075 wt % Voranol 3010 polyol; (g) 0.03 wt % Proxel GXL; and (h) the balance water. This black ink had a pH of about 8.5.

FIGS. 1A–D illustrate that without bleed control, there is a ragged border between each of the color areas and the cross-hatched black areas. The ragged border is particularly evident in FIG. 1A between black and yellow inks. Thus, the need for the bleed control achieved in the practice of the present invention is apparent.

To illustrate the effects of printing on a different paper, the same inks were printed on different papers as follows: the same ink patterns of FIGS. 1A–D, 3A–D, and 5A–D, having been printed on Gilbert Bond, were respectively printed on Champion Datacopy paper in FIGS. 2A–D, 4A–D, and 6A–D. Bleed is paper-dependent, and Champion Datacopy tends to bleed more than Gilbert Bond. For example, the same ink patterns of FIGS. 1A–D on Gilbert Bond paper evidence more bleed when printed on Champion Datacopy paper as in FIGS. 2A–D. However, the use of the soluble organic acids in accordance with the present invention is seen to reduce bleed on both papers.

To illustrate the benefits achieved in the practice of the invention, FIGS. 3A–D depict four different combinations of yellow inks (seen as the white areas) with a cross-hatching of the above-described black ink printed thereon. The yellow ink area of FIG. 3A was printed from a single chamber, while the yellow ink area of FIGS. 3B through 3D were double density, meaning that two different yellow inks were printed over the same area by two different chambers of the pen. More specifically, the yellow area of FIG. 3A represents a single application of a yellow ink containing acetic acid; the yellow area of FIG. 3B represents an application of yellow ink containing acetic acid and another yellow ink containing citric acid; and the yellow areas of FIGS. 3C and 3D represent an application of yellow ink containing acetic acid and another yellow ink without an organic acid. The compositions of the yellow ink containing acetic acid, the yellow ink containing citric acid, and the yellow ink without an organic acid are as follows:

TABLE 2

Yellow Ink Formulations of FIGS. 3A–D
(All values are weight percent unless otherwise indicated.)

| Component | Yellow Ink with Acetic Acid | Yellow Ink with Citric Acid | Yellow Ink without Precipitant |
|---|---|---|---|
| AY23-TMA[1] | 2.75 | 2.75 | 2.75 |
| diethylene glycol | 4.0 | 4.0 | 4.0 |
| EHPD | 8.0 | 8.0 | 8.0 |

TABLE 2-continued

Yellow Ink Formulations of FIGS. 3A–D
(All values are weight percent unless otherwise indicated.)

| Component | Yellow Ink with Acetic Acid | Yellow Ink with Citric Acid | Yellow Ink without Precipitant |
|---|---|---|---|
| 2-pyrrolidone | 4.0 | 4.0 | 4.0 |
| nonionic surfactant | 2.5 | 2.5 | 2.5 |
| acetic acid | 3.0 | — | — |
| citric acid | — | 5.0 | — |
| water | balance | balance | balance |
| pH[2] | 4.0 | 4.0 | 4.0 |

[1]Acid Yellow 23 associated with TMA
[2]A sufficient amount of tetramethylammonium hydroxide (TMAOH) was added to the ink formulations to achieve the indicated pH.

Notably, it would be expected with a double density of yellow ink that bleed would be even more problematic than with a single density of yellow ink. However, FIG. 3B, which represents a double density of inks made in accordance with the invention, evidences less bleed than FIG. 3A, which represents only a single density of ink. Moreover, the double density of yellow inks of FIG. 3B results in less bleed than the double density applications of FIG. 3C and 3D, of which only one of the two inks was formulated in accordance with the invention. It can be concluded from FIGS. 3A through 3D that the more acid the better and the lower the pKa the better. Further, mixtures of organic acids are possible and can yield highly satisfactory results.

A comparison was made between a yellow ink formulated in accordance with the invention and a yellow ink employing a multivalent salt for bleed control, namely, calcium nitrate. The results of this comparison are presented in FIGS. 5A–D. The yellow ink area of FIG. 5A was printed from a single chamber, while the yellow ink areas of FIGS. 5B through 5D were double density. More specifically, the yellow area of FIG. 5A represents a single application of a yellow ink containing calcium nitrate; the yellow area of FIG. 5B represents an application of yellow ink containing calcium nitrate and another yellow ink containing citric acid; the yellow area of FIG. 5C represents an application of yellow ink containing citric acid and another yellow ink without an organic acid or multivalent salt; and the yellow area of FIG. 5D represents an application of yellow ink containing calcium nitrate and another yellow ink without an organic acid or a multivalent salt. The compositions of the yellow ink with citric acid and the yellow ink without an organic acid or a multivalent salt are given in Table 2. The composition of the yellow ink containing calcium nitrate is as follows: (a) 2.75 wt % Acid Yellow 23-TMA; (b) 4.0 wt % diethylene glycol; (c) 8.0 wt % EHPD; (d) 4.0 wt % 2-pyrrolidone; (e) 2.5 wt % nonionic surfactant; (f) 7.0 wt % CaNO$_3$.4H$_2$O; (g) 0.2 wt % Proxel GXL; (h) 0.2 wt % MES in free acid form; and (i) the balance water. The pH of this yellow ink was adjusted to about 6.5 with a 25% solution of tetramethylammonium hydroxide (TMAOH). Again, the yellow areas in FIGS. 5A–D were cross-hatched with the above-described black ink.

It can be concluded from FIGS. 5A–D that the yellow ink containing 5 wt % citric acid in accordance with the invention evidences less bleed than the yellow ink containing a multivalent salt. More specifically, there is less bleed in FIGS. 5B and 5C, which employed some yellow ink with citric acid, than in FIGS. 5A and 5D, which depend solely upon calcium nitrate to reduce bleed. Similar results are achieved on a different paper, as illustrated in FIGS. 6A–6D.

Figure 7:
FIGS. 7A–C are line drawings comparing the bleed control achieved for two yellow inks formulated in accordance with the invention versus yellow ink formulated with a multivalent ion, with the yellow inks having been printed on Gilbert Bond paper and over-printed by black ink having a pH-sensitive pigment.
Figure 8:
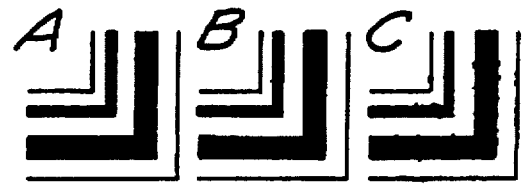
FIGS. 8A–C are line drawings comparing the bleed control achieved for two yellow inks formulated in accordance with the invention versus a yellow ink without bleed control components, with the yellow inks having been printed on Gilbert Bond paper and over-printed by black ink having a pH-sensitive pigment.

Finally, FIGS. 7 and 8 provide a comparison between the bleed control achieved with various soluble organic acids and that achieved with calcium nitrate or without any precipitant at all, all on Gilbert Bond paper. The black ink of FIGS. 7 and 8 is a pigment-based black ink as opposed to the dye-based ink of FIGS. 1–6, thereby illustrating that bleed control is achieved in the practice of the invention for both dye-based and pigment-based pH-sensitive inks. The piginent-based black ink, a proprietary composition, is employed in Hewlett Packard's DeskJet 660® ink-jet printer and has a pH of about 8.5.

The yellow inks of FIGS. 7A and 7B contain ascorbic acid and citric acid, respectively, while the yellow ink of FIG. 7C contains calcium nitrate. The yellow inks of FIGS. 8A and 8B contain malonic acid and malic acid, respectively, while the yellow ink of FIG. 8C contains no precipitant. The composition of the yellow ink containing calcium nitrate for FIG. 7C is provided above. The composition of the yellow ink without a precipitant for FIG. 8C is provided above in Table 2. The yellow ink compositions for FIG. 7A–B and 8A–B are as follows in Table 3:

TABLE 3

Yellow Ink Formulations of FIGS. 7A–B and 8A–B
(All values are weight percent unless otherwise indicated.)

| Component | Yellow Ink with Ascorbic Acid (FIG. 7A) | Yellow Ink with Citric Acid (FIG. 7B) | Yellow Ink with Malonic Acid (FIG. 8A) | Yellow Ink with Malic Acid (FIG. 8B) |
| --- | --- | --- | --- | --- |
| AY23-TMA[1] | 2.75 | 2.75 | 2.75 | 2.75 |
| diethylene glycol | 4.0 | 4.0 | 4.0 | 4.0 |
| EHPD | 8.0 | 8.0 | 8.0 | 8.0 |
| 2-pyrrolidone | 4.0 | 4.0 | 4.0 | 4.0 |
| nonionic surfactant | 2.5 | 2.5 | 2.5 | 2.5 |
| ascorbic acid | 9.0 | — | — | — |
| citric acid | — | 10.0 | — | — |
| malonic acid | — | — | 5.0 | — |
| malic acid | — | — | — | 6.7 |
| water | balance | balance | balance | balance |
| pH[2] | 4.0 | 4.0 | 4.0 | 4.0 |

[1]Acid Yellow 23 associated with TMA
[2]A sufficient amount of TMAOH was added to the ink formulations to achieve the indicated pH.

It can be concluded from FIGS. 7A–C that inks formulated with a soluble organic acid such as ascorbic acid or citric acid effect similar bleed control than inks containing multivalent ions such as calcium nitrate. Likewise, it can be concluded from FIGS. 8A–C that inks formulated with a soluble organic acid such as malonic or malic acid effect better bleed control than inks without any such bleed control measures.

Notably, FIG. 8C represents the limited bleed control achievable with the method of Shields et al '045. The method of Shields et al '045 repends solely upon a pH differential of between 4 and 5 units to achieve bleed control, and analogously, there was a pH differential of about 4.5 units between the yellow and black ink compositions of FIG. 8C. Without the organic acid component contained in the yellow inks of FIGS. 8A and 8B, the yellow ink of FIG. 8C was dependent upon the pH differential alone to arrest bleed. It is readily apparent that the presence of an organic acid in the yellow inks of FIGS. 8A and 8B resulted in improved bleed control over that of FIG. 8C. Therefore, it can be concluded that the incorporation of an organic acid in accordance with the present invention improves upon the bleed control achieved by pH differential alone per Shields et al '045.

Thus, it has been demonstrated that the addition of a soluble organic acid to a target ink-jet ink composition, together with a modest pH differential between the target ink-jet ink and the pH-sensitive ink, achieves substantial bleed control.

INDUSTRIAL APPLICABILITY

The present method and ink composition disclosed herein for controlling bleed between adjacently-printed inks are expected to find commercial use in ink-jet color printing.

Thus, there has been disclosed herein an ink-jet ink composition including an organic acid for the purpose of reducing the pH differential required to reduce bleed from an adjacent ink-jet ink composition containing a pH-sensitive colorant. Additionally, a method for reducing bleed by employing the same ink-jet ink composition is disclosed. It will be readily apparent to those skilled in the art that various changes and modifications of an obvious nature may be made without departing from the spirit of the invention, and all such changes and modifications are considered to fall within the scope of the invention as defined by the appended claims.

What is claimed is:

1. A first ink-jet ink composition for thermal ink-jet printing, said first ink-jet ink composition having a pH such that a pH differential exists between said first ink-jet ink composition and a second ink-jet ink composition, said second ink-jet ink composition having a pH-sensitive colorant, said pH differential being sufficient to effect precipitation of said pH-sensitive colorant upon contact of said second ink-jet ink composition with said first ink-jet ink composition, such that bleed of said second ink-jet ink composition into said first ink-jet ink composition is substantially reduced in the event said first and second ink-jet ink compositions are adjacently printed on a print medium, said first ink-jet ink composition including at least one organic acid at a concentration ranging from about 0.5 to 20 wt %, wherein the pH differential required to effect a reduction in bleed of said second ink-jet ink composition into said first ink-jet ink composition is reduced by the presence of said at least one organic acid in said first ink-jet ink composition.

2. The first ink-jet ink composition of claim 1 wherein said at least one organic acid is selected from the group consisting of monofunctional organic acids, difunctional organic acids, and polyfinctional organic acids.

3. The first ink-jet ink composition of claim 2 wherein said at least one organic acid is selected from the group consisting of polyacrylic acid, acetic acid, glycolic acid, malonic acid, malic acid, maleic acid, ascorbic acid, succinic acid, glutaric acid, fumaric acid, citric acid, tartaric acid, lactic acid, sulfonic acid, ortho-phosphoric acid, derivatives thereof.

4. The first ink-jet ink composition of claim 1 wherein said pH differential ranges from about 1 to 3 units.

5. The first ink-jet ink composition of claim 4 wherein said pH differential is about 3 units.

6. The first ink-jet ink composition of claim 1 wherein said first ink-jet ink composition has a pH that is lower than that of said second ink-jet ink composition.

7. The first ink-jet ink composition of claim 6 wherein said first ink-jet ink composition has a pH of at least about 4.

8. The first ink-jet ink composition of claim 1 wherein said pH-sensitive colorant comprises a colorant selected from the group consisting of carboxylated azo dyes, carboxylated copper phthalocyanine dyes, carboxylated xanthene dyes, dyes whose solubilities decrease as pH is lowered, and pigments dispersed with a dispersant having a pH-sensitive functionality.

9. The first ink-jet ink composition of claim 1 wherein said second ink-jet ink composition comprises a pH-sensitive colorant and a vehicle and wherein said first ink-jet ink composition comprises (a) about 0.1 to 4 wt % of at least one dye, (b) up to about 5 wt % of at least one glycol ether, (c) about 3 to 20 wt % of at least one diol, (d) about 3 to 9 wt % 2-pyrrolidone, (e) up to about 4 wt % surfactant, (f) about 0.25 to 20 wt % of at least one organic acid, (g) sufficient buffer to achieve said pH, and (h) the balance water.

10. A method of reducing the bleed in printing at least two different color inks onto a print medium from an ink-jet pen, said at least two different color inks comprising a first ink-jet ink composition and a second ink-jet ink composition having a pH-sensitive colorant and a measurable pH, said method comprising formulating said first ink-jet ink composition to include at least one organic acid at a concentration ranging from about 0.5 to 20 wt % and to have a pH such that a sufficient pH differential exists between said first ink-jet ink composition and said second ink-jet ink composition such that said pH-sensitive colorant precipitates in the event it is contacted by said first ink-jet ink composition, wherein the pH differential required to effect a substantial reduction in bleed of said second ink-jet ink composition into said first ink-jet ink composition is reduced by the presence of said organic acid in said first ink-jet ink composition.

11. The method of claim 10 wherein said at least one organic acid is selected from the group consisting of monofunctional organic acids, difunctional organic acids, and polyfunctional organic acids.

12. The method of claim 11 wherein said at least one organic acid is selected from the group consisting of polyacrylic acid, acetic acid, glycolic acid, malonic acid, malic acid, maleic acid, ascorbic acid, succinic acid, glutaric acid, fumaric acid, citric acid, tartaric acid, lactic acid, sulfonic acid, ortho-phosphoric acid, derivatives thereof.

13. The method of claim 10 wherein said pH differential ranges from about 1 to 3 units.

14. The method of claim 13 wherein said pH differential is about 3 units.

15. The method of claim 10 wherein said first ink-jet ink composition has a pH that is lower than that of said second ink-jet ink composition.

16. The method of claim 15 wherein said first ink-jet ink composition has a pH of at least about 4.

17. The method of claim 10 wherein said pH-sensitive colorant comprises a colorant selected from the group consisting of carboxylated azo dyes, carboxylated copper phthalocyanine dyes, carboxylated xanthene dyes, dyes whose solubilities decrease as pH is lowered, and pigments dispersed with a dispersant having a pH-sensitive functionality.

18. The method of claim 10 wherein said second ink-jet ink composition comprises a pH-sensitive colorant and a vehicle and wherein said first ink-jet ink composition comprises (a) about 0.1 to 4 wt % of at least one dye, (b) up to about 5 wt % of at least one glycol ether, (c) about 3 to 20 wt % of at least one diol, (d) about 3 to 9 wt % 2-pyrrolidone, (e) up to about 4 wt % surfactant, (f) about 0.25 to 20 wt % of at least one organic acid, (g) sufficient buffer to achieve said pH, and (h) the balance water.

* * * * *